United States Patent [19]

Toledo et al.

[11] Patent Number: 6,120,732
[45] Date of Patent: Sep. 19, 2000

[54] MICROBIAL INACTIVATION BY HIGH-PRESSURE THROTTLING

[75] Inventors: Romeo T. Toledo, Hull; Joe Edgar Moorman, Jr., Athens, both of Ga.

[73] Assignee: University of Georgia Research Foundation, Inc., Athens, Ga.

[21] Appl. No.: 09/103,098

[22] Filed: Jun. 23, 1998

Related U.S. Application Data

[60] Provisional application No. 60/050,549, Jun. 23, 1997.

[51] Int. Cl.$^7$ ..................................................... A23L 3/015
[52] U.S. Cl. ............................................. 422/39; 426/665
[58] Field of Search ................................ 422/39; 426/665

[56] References Cited

U.S. PATENT DOCUMENTS

| | | | |
|---|---|---|---|
| 2,069,820 | 2/1937 | Dodge | 422/39 |
| 5,288,462 | 2/1994 | Carter et al. | 422/39 |
| 5,658,610 | 8/1997 | Bergman et al. | 426/665 |
| 6,033,717 | 3/2000 | Agterof et al. | 426/665 |

FOREIGN PATENT DOCUMENTS

| 0040887 | 2/1981 | European Pat. Off. | 422/39 |
|---|---|---|---|

OTHER PUBLICATIONS

Alemán, G. D., Ting, E. Y., Mordre, S.C. Hawes, A. C. O., Walker, M., Farkas, D. F., and Torres, J. A 1996. Pulsed Ultra–High Pressure Treatments For Pasteurization of Pineapple Juice *J Food Sci* 61:388–390.

Cheftel, J. C. 1995. Review—High–Pressure, Microbial Inactivation and Food Preservation. *Food Sci Technol Int* 1:75–90.

Fantin, G., Fogagnolo, M., Guerzoni, M. E., Lanciotti, R., Medici, A., Pedrini, P., and Rossi, D. 1996. Effect of High Hydrostatic–Pressure and High–Pressure Homogenization On The Enantioselectivity Of Microbial Reductions. *Tetrahedron–Asymmetry* 7:2879–2887.

Hayakawa, Isao, Linkko, Yu–Yen and Linko, Pekka, Novel Mechanical Treatments of Biomaterials. *Lebensm.Wiss. U.Technol.*, 29, 395–403 (1996).

Lanciotti, R., Sinigaglia, M., Angelini, P. and Guerzoni, M. E. 1994. Effects Of Homogenization Pressure On The Survival And Growth Of Some Food Spoilage And Pathogenic Micro–Organisms. *Lett Appl Microbiol* 18:319–322.

Lanciotti, R., Gardini, F., Sinigaglia, M., and Guerzoni, M.E. 1996 Effects Of Growth Conditions On The Resistance Of Some Pathogenic And Spoilage Species To High Pressure Homogenization. *Lett Appl Microbiol* 22:165–168.

Lehmann, G 1996. High–Pressure Treatment—a New Food–Technology. *Fleischwirtschaft* 76:1004–1005 Language: German.

Mertens, B., and Deplace, G. 1993. Engineering Aspects Of High–Pressure Technology In The Food–Industry. *Food Technol* 47:164–169.

Moorman, J., Toledo, R. T. and Schmidt, K.(1996) High–pressure throttling (HPT) reduces microbial population, improves yogurt consistency, and modifies rheological properties of ultrafiltered milk; presented at the Institute of Food Technologists Annual Meeting in New Orleans, LA Jun. 23, 1996.

Popper, L. and D. Knorr, 1990. Applications of High–Pressure Homogenization for Food Preservation. *Food Technol* 44:84–89.

Pothakamury, U.R., Barbosa–Canovas, G. V., Swanson, B.G., and Meyer, R.S. 1995. The Pressure Builds For Better Food–Processing. *Chem Eng Prog* 91:45–53.

*Primary Examiner*—Robert J. Warden, Sr.
*Assistant Examiner*—Theresa Snider
*Attorney, Agent, or Firm*—Needle & Rosenberg, P.C.

[57] ABSTRACT

Processes and apparati for inactivating microorganisms in flowing or pulsed liquids are provided. The processes consist of pressurizing the liquid and then depressurizing the liquid by directing it through one or more constrictions into an area of reduced pressure. The apparati comprise two fluid containing vessels, one of which is capable of being pressurized, the two vessels being in fluid communication through one or more constrictions, one or more of which may be adjustable, and a means for increasing pressure in one vessel. Specific embodiments include the use of a pressure intensifer to pressurize the liquid and an adjustable orifice, such as a micrometering valve, to form the constriction(s).

9 Claims, 1 Drawing Sheet

MICROBIAL INACTIVATION BY HIGH-PRESSURE THROTTLING

This application claims priority in Provisional Application Ser. No. 60/050,549, which was filed Jun. 23, 1997.

BACKGROUND OF THE INVENTION

1. Field of the Invention

The present invention relates to processes and apparati for inactivating micro-organisms from liquids and improving the functional properties of food products using high pressure.

2. Background Art

Conventional thermal processing of milk, fruit juices and other foods to eliminate pathogens and control spoilage organisms may have adverse effects on flavor, vitamin content and functional properties or not completely inactivate undesirable enzymes such as pectinesterase (which causes the loss of cloud stability in fruit juices). Thus, there is a need to develop processing alternatives to conventional thermal processing for food production. In addition, foodborne illness due to the survival of pathogens in foods which were once considered safe due to intrinsic factors such as acidity (e.g., the October, 1996 *Escherichia coli* O157:H7 outbreak in Odwalla brand apple juice) may demand alternative processes which ensure food safety while protecting the delicate flavors of these foods. Additionally, there is a need for a process to sterilize heat-sensitive pharmaceutical preparations.

Physical phenomena such as microwaves, infrared, ultraviolet or gamma irradiation, high intensity laser or non-coherent light pulses, ultrasound, ohmic heating, pulsed electric fields, high voltage electric discharges ("electroporation"), bactericidal enzymes, mild heat with slight pressurization ("manothermosonication"), and extrusion cooking have been investigated singly or in combination as a means of processing dairy and other foods (Gallman and Eberhard, 1993, Gould, 1995, Knorr et al., 1994, Mertens and Knorr, 1992). Although additive or synergistic combinations of these technologies have been suggested as potential alternatives to conventional thermal processing which should improve food quality, functionality and safety, to date all these alternative methods have required the use of conventional heat exchangers to provide a sufficient microbicidal effect of these processes.

Nonthermal processing of foods, such as high hydrostatic pressure ("HHP") and high pressure homogenization ("HPH"), are considered a more "gentle" means of processing than conventional thermal processing. They will denature proteins, inactivate enzymes, gelatinize starches and inactivate microorganisms, while minimizing the loss of colors, flavors, aromas and vitamins and other nutrients. In addition, since these processes are non-thermal, foods so processed do not develop toxic components, and off-flavors are not produced. Another secondary advantage of non thermal processing by HHP and HPH is that gelled egg and seafood proteins are superior in many aspects to the gels formed by thermal processing.

High hydrostatic pressure (HHP)—the use of a high isostatic pressure to inactivate microbes and alter the physicochemical and functional properties of foods (e.g., form gels)—is currently in use commercially in a wide range of foods. Milk, juices and other liquid foods may be processed semi-continuously in a series of batched high-pressure vessels. Non-liquid foods are processed in packages of flexible films or other material stacked in a high-pressure vessel, and typically water is used as the carrier medium (Lehmann, 1996; Pothakamury et al., 1995). Pressure may be applied directly by high-pressure vessels of the piston-and-cylinder design or indirectly by pressure intensifiers attached to the vessels. Pressures vary depending on the application, but are ordinarily in the range of 400 to 900 MPa. In Japan, HHP is being used commercially on a wide variety of food products to inactivate microbes, produce excellent gels and retain more vitamins, natural flavors, colors and aromas than would be possible with thermal processing. Lehmann (1996) has reported that it should be possible to use the HHP technology to sterilize cosmetics and pharmaceuticals. Although HHP can be effective for certain applications, the technology has the disadvantages of being a batch process with long process times of an hour or more required to achieve desired results. Additionally, HHP has not proved reliable in terms of the degree of microbial inactivation accomplished under standard operating conditions.

HHP has been evaluated for a number of antimicrobial applications, ranging from the human-immunodeficiency virus that causes AIDS (Nakagami et al., 1996) to the herpes simplex virus (Nakagami et al., 1992) to a host of foodborne pathogens, "model pathogens" and spoilage organisms in a variety of food medi. In general, gram-negative bacteria arc most sensitive to HHP, followed by yeasts, complex viruses, molds, and gram-positive bacteria, but researchers have noted that there is much inter- and intra-species variation in the resistance of microorganisms to HHP (Cheftel, 1995) and that exponential-phase cells are much more resistant to HHP than stationary-phase cells (Cheftel, 1995, Mackey et al., 1995). Patterson et al. (1995) found that 15 min of HHP treatments of 350 MPa, 375 MPa, 450 MPa, 700 MPa, and 700 MPa were required to achieve 5 log cycle reductions in *S. typhimurium, L. monocytogenes, S. enteritidis, E. coli* O157:H7, and *S. aureus* respectively, and that there was significant variation in the baroresistance between different strains of both *L. monocytogenes* and *E. coli* O157:H7.

Additionally, the physicochemical composition of the medium may confer resistance to HHP (Cheftel, 1995, Mackey et al., 1995), and in general, microorganisms exhibit more resistance to HHP in certain foods than in buffers (Cheftel, 1995, Gervilla et al., 1997, Patterson et al., 1995).

Microbial inactivation by HHP may be improved by increasing processing temperatures to above 50° C. or lowering to between −30 and 5° C. (Cheftel, 1995). Still, most surviving cells are sublethally-injured and survival rates are dependent on a recovery period, which may overstate HHP effectiveness per se and indicates a need to combine this process with other technologies to achieve optimal microbial inactivation.

Thus, the disadvantages of HHP processing can be divided into at least three categories: economic feasibility, engineering limitations, and microbial safety concerns. The economic feasibility of commercial HHP is limited by the high cost of capital investment for new equipment (Mertens and Deplace, 1993) and the low productivity and high labor cost of the batch process. Some "semi-continuous" systems have been developed for the processing of juices and other liquid foods (Pothakamury et al., 1995), but these are only marginal improvements, in terms of economics. In the case of foods processed as discrete retail packages, there are the concerns of volume inefficiency, where space is wasted as package and inter-package volume, and inefficient process cycle times, which must include time for loading, unloading, pressurizing and decompressing. Feasibility is further limited by the long process times of 30 minutes to 1 hour required by some applications. While these feasibility problems may be somewhat mitigated by increasing the size of the pressure vessel, size is limited by engineering concerns, which call for thicker walls to accommodate even modest increases in internal volume. Current technology limits the size of pressure vessels that can be forged to an internal volume of approximately 700 L for an operating pressure of 500 MPa (Mertens and Deplace, 1993).

A critical problem with HHP processing is ensuring the effectiveness of microbial inactivation. Bacterial spores can survive HHP in excess of 1000 MPa, and some bacterial spores may be "superdormant" and not respond to conditions conducive to germination before HHP processing (Cheftel, 1995). Anaerobic spore-forming pathogens such as *Clostridium botulinum* and *Clostridium perfrigens* and spoilage organisms such as *Bacillus stearothermophilus* are a concern in low-acid foods preserved by high-temperature processing (Jay, 1992), and may present a serious problem in applying HHP processing to certain foods. In a review article, Hayakawa (1996) addressed this problem and demonstrated that repeated isostatic pressurization, i.e. 5–6 cycles of 5 minutes or longer duration during which the maximal pressure reaches 600 MPa and the temperature of the fluid is at 70° C., can destroy *Bacillus stearothermophilus* spores, but this remains a harsh treatment for many fluids, and the requirement for cycling is impractical for most commercial applications. In addition, recent work indicates that microorganisms may be induced to develop resistance to HHP. Hauben et al. (1997) used alternating cycles of HHP treatment followed by outgrowth and cultivation of survivors to isolate three barorcsistant mutants of *E. coli* MG1655 which were able to survive HHP at 800 MPa for 15 min.

The use of HPH has been more limited than HHP, with applications being primarily the stabilization of emulsions and the extraction of intracellular enzymes and other proteins from plant and animal cells. Some investigation of the application of HPH to microbial inactivation has occurred in studies on the recovery of intracellular materials from yeasts and other microbial cultures, but the use of HPH in these studies was not to produce microbially-stable foods (Bailey et al., 1995, Baldwin and Robinson, 1992, Middelberg, 1995, Siddiqi et al., 1995, Siddiqi and Titchenerhooker, 1996). To liberate the desired intracellular products, cell disruption is achieved by multiple passes through the homogenizer at pressures ranging from approximately 10 to 100 MPa (Baldwin and Robinson, 1992, Siddiqi et al., 1995, Siddiqi and Titchenerhooker, 1996). Studies on the application of HPH processing to the inactivation of pathogens and spoilage organisms in foods have produced variable results. At an HPH pressure of 150 MPa, Lanciotti et al. (1996) observed variable reductions (1 to 6 log cfu/ml) in populations of *E. coli, L. monocytogenes, S. aureus* and *Y. lipolytica* in one pass through the HPH system, and noted that pretreatment incubation temperature, pH, $a_w$ and the species of microorganism interact to affect the extent of reductions greatly. These variable results imply that the thermal history and physicochemical composition of a food can have a significant impact on the ability of HPH processing to inactivate the microbes in the food (Lanciotti et al., 1996). Using single-pass HPH of 150 MPa, Fantin et al. (1996) reduced populations of four strains of *S. cerevisiae* by 1 to 2 log cfu/ml and populations of four strains of *Y. lipolytica* by 1 to 3 log cfu/ml. Popper and Knorr (1990) observed reductions of 1 to 2 log cfu/ml in populations of *B. subtilis* and *S. lactis* subjected to one-pass HPH at 150 MPa. Bailey et al. (1995) observed that recombinant *E. coli* cells harvested in the stationary growth phase were more resistant to multiple-pass HPH in the range of 41 to 62 MPa than exponential growth phase cells.

It is interesting to note that researchers have noted exactly the opposite resistance trends for stationary and exponential phase cell cultures for HPH and HHP. These opposing observations for the two techniques highlights the unpredictability of these techniques for microbial inactivation and also demonstrates why they have not been implemented commercially for use as antimicrobial processes. The techniques of HPH and HHP do not provide reliable and consistent inactivation of microbes in liquids.

The U.S. Food and Drug Administration (FDA), in direct response to the Odwalla apple juice contamination, has considered mandatory pasteurization of all fresh juices, and while it decided to not require pasteurization of fresh juices at this time, the National Advisory Committee on Microbiological Criteria for Foods reported that "producers should strongly consider pasteurization until alternative risk management strategies are developed".

Thus, there is a need to develop processing alternatives. The invention described herein provides a continuous high-pressure process to treat liquids, such as milk, juices, other liquid and semi-fluid (i.e. flowable) foods, and liquid pharmaceutical preparations that destroys micro-organisms typically found in these liquids.

The invention described herein provides the advantage of being a more consistent and reliable process for inactivating microbes in fluids. This invention provides another advantage in being a continuous process, so pressure vessels of extremely large diameter are not needed. In commercial applications, continuous processes are in general more economically feasible than batch processes. Additionally, the process and apparatus of this invention allow in-line filling and sealing of containers, thus avoiding potential reintroduction of microorganisms.

SUMMARY OF THE INVENTION

The present invention satisfies the long-felt need in the art for a nonthermal process that can effectively and economically destroy microorganims in a continuously or pulsed flowing liquid. The present invention also provides a process for improving the functional properties of complex fluids, such as food products, without the use of heat. The present invention, herein referred to as High-Pressure Throttling (HPT), uses high pressure to continuously throttle liquids from an elevated pressure, typically at least 200 MPa, through one or a multiplicity of constrictions to a much reduced pressure, typically atmospheric pressure, for the purposes of inactivating micro-organisms and improving functional properties of the liquid.

DEFINITIONS

As used in the claims, "a" can mean one or more, depending on the context of the claim.

As used through this application, pressure is reported in megapascal units, indicated as "MPa". One MPa is approximately equal to 10 bars or 145 pounds per square inch (psi).

As used in this application, "microbe" or "microorganism" shall include bacteria, fungi, viruses, protozoa, and prions.

As used throughout this application, "orifice" shall mean one or more openings of any size or shape which would be adequate to reduce the pressure from an elevated pressure, such as 200–400 MPa, to atmospheric pressure, i.e. 0.1 MPa.

As used throughout this application, "pressure intensifier" shall mean any device which can pressurize the liquid in the vessel, including but not limited to a hydraulic-driven piston, a multi-stage pump, or a progressing cavity pump.

"$D_x$ value" means the time it takes to inactivate 90% of the organisms at a temperature of X.

"z value" means the temperature change required to change the $D_x$ value by a factor of 10.

DETAILED DESCRIPTION OF THE INVENTION

Figure 1:
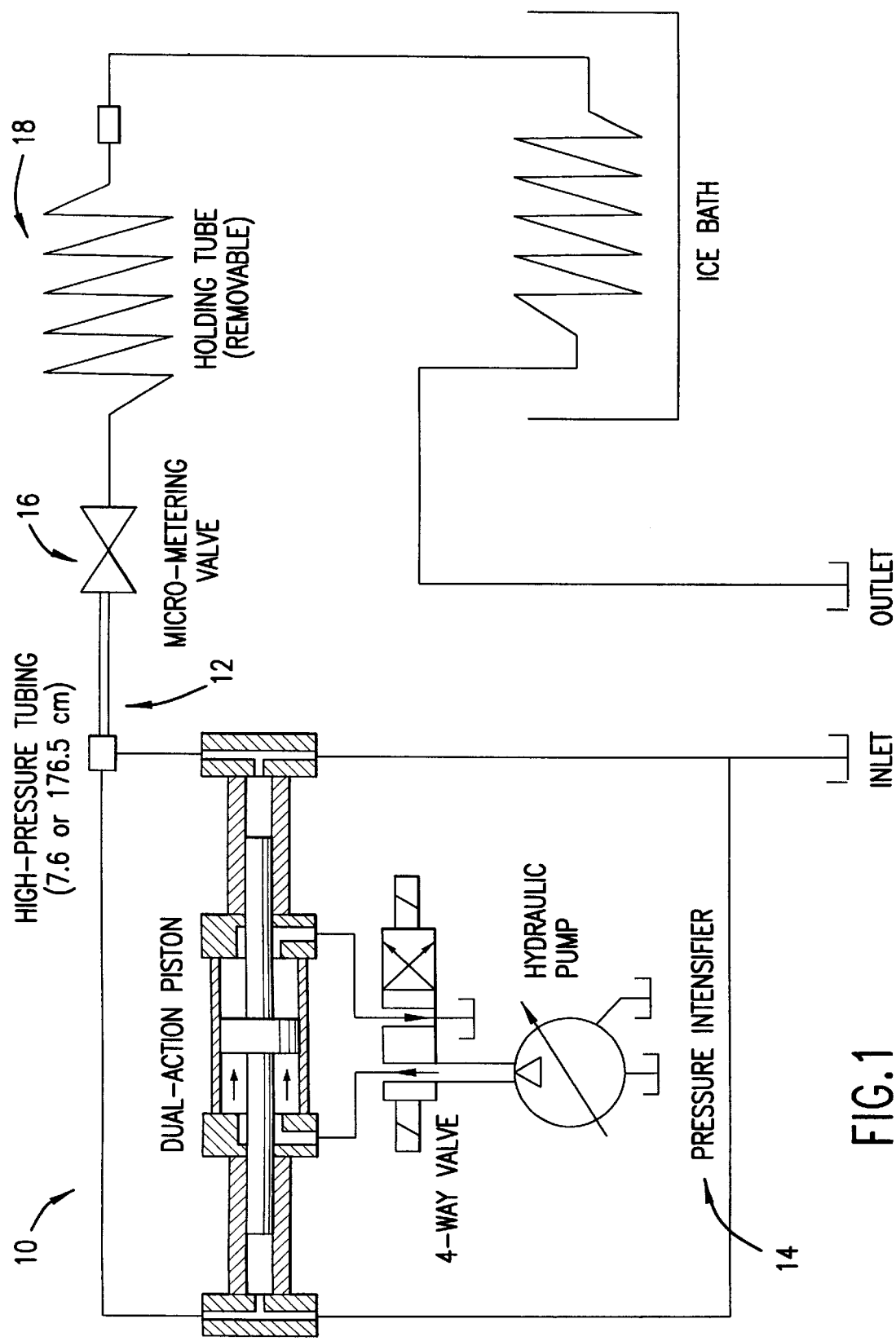
FIG. 1 represents a schematic diagram of one embodiment of the present invention.

The present invention provides a continuous flow, high-pressure process for inactivating microorganisms present in liquids, such as foods and pharmaceutical preparations. Types of foods that can be treated include milk, fruit juices, fruit purees, liquid eggs, and fruit flavored beverages. The process consists of pressurizing the liquid as it flows through a vessel of specified volume and then depressurizing the liquid by directing it through one or a multiplicity of constrictions, or orifices, into an area of reduced pressure.

The present process has the advantage of providing microbial inactivation of volumes of liquid flowing through a system. The liquid can be supplied from any source and enters the first vessel through an opening in the upstream flow side of the first vessel. The opening can be sealed and reopened as needed to resupply the first vessel. The pressurizing means forces the liquid out of the first vessel through the orifice and into the second vessel. From the second vessel, the liquid can be further processed or packaged. Thus, the present process and apparatus can be used in many existing systems to provide or augment microbial inactivation.

The present invention further provides a process which can impart novel rheological properties to food products, such as increased viscosity, which can improve customer acceptance, shelf-life, and nutritional quality. Types of foods that can be improved include low fat coffee creamers, skim milk, skim milk concentrate, and milk used to make yogurt, cottage cheese or cheese.

The present invention provides a process which minimizes waste in processing, since the process comprises the pressurization of small volumes in a continuous flow system.

While not to be construed in any way to limit the interpretation of the claims made herein, it is proposed that the sudden pressure release accomplished in the present invention, which creates extremely high shear due to the constriction through which the microbe must pass, causes the inactivation of micro-organisms. Additionally, the high shear created by the sudden pressure release may induce conformational changes in milk proteins and disruption of the casein micellar structure, followed by protein stretching, alignment and re-aggregation of the disrupted protein micelles into larger macromolecular structures which bind more water, thereby causing the increase in viscosity which is associated with improved texture, or "mouth feel". Until the present invention, such improvements in viscosity were sometimes accomplished through food additives, such as polysaccharides. Thus, the present invention provides a process for improving food quality without additives.

The present invention provides an apparatus 10, for inactivating microorganisms present in liquids, such as foods and pharmaceutical preparations, comprising a) a first vessel 12 for isolating a portion of a flowing liquid, b) means 14 for pressurizing the first vessel 12, with liquid flowing through it, located at the upstream flow side of said first vessel 12, c) one or a multiplicity of orifices 16, one or more of which may or may not be adjustable, located at the downstream flow side of the first vessel 12, d) means for adjusting the orifice from its minimal aperture to its maximal aperture, and e) a second vessel 18 in fluid communication with and located on the downstream flow side of the orifice 16 for receiving the liquid as it passes through the orifice 16 from the first vessel 12. Although many parts of the M-140K MICROFLUIDICS PROCESSOR can be used in the apparatus of the present invention, the present invention does not contemplate the use of an emulsifying step, such as is accomplished in the interaction chamber of the MICROFLUIDICS device.

In one embodiment, the means for increasing pressure in the first vessel is accomplished through a pressure intensifier. Several pressure intensifiers are commercially available and readily interchangeable in the present invention. Examples of pressure intensifiers include the HYDRO-PAC® P60-03CXS and MICROFLUIDICS® IP40-05SP. As shown in FIG. 1, one example of a pressure intensifier includes a dual-action piston, a four-way valve, and a hydraulic pump.

In one embodiment, the orifice may be comprised of a multiplicity of orifices, some or all of which may be adjustable, and such adjustments are able to be made independently of any other orifice. In a preferred embodiment, shown in FIG. 1, the adjustable orifice is a micro-metering valve. The use of an adjustable orifice permits the rapid removal of particles or other materials that clog the device, so that the overall fluid processing is not significantly disrupted. However, the orifice is not required to be adjustable.

In another embodiment, preferred for highly contaminated fluids, the apparatus further comprises a pressure controller, such as a pneumatically controlled or transducer controlled valve, located between the pressure intensifier and the micrometering valve.

In one embodiment, the liquid is directed through the orifice (or orifices) into a receiving vessel held at atmospheric pressure, which is approximately 0.1 MPa. In another embodiment, the receiving vessel is a coil 18 that can be immersed in a bath or otherwise have its temperature maintained at a temperature different than the surrounding air temperature. In another embodiment, preferred for heat-sensitive fluids, the receiving vessel is a coil embedded within a heat exchanger, such as an ice bath.

In a preferred embodiment, the apparatus is manufactured with materials, such as stainless steel, so that the entire device can be easily sterilized between uses to minimize the inadvertent introduction of any microorganisms after the throttling step.

In a specific embodiment, the apparatus is comprised of a double-acting electro-hydraulic pressure intensifier (HYDROPAC® P60-03CXS, Erie, Pennsylvania) to force fluid at 310 MPa through a micro-metering valve (AUTOCLAVE ENGINEERS® 60VRMM4882; Erie, Pa.) to atmospheric pressure.

In applications involving food products, ideally the configuration for the apparatus should meet the Food and Drug Administration's regulations and guidelines for "clean-in-place" procedures. Vessels that are cylindrically shaped would be a preferred choice for these applications, since they will not have "blind spots" or "cul de sacs" where contaminants could accumulate and not be easily flushed out.

The present invention is more particularly described in the following examples which are intended as illustrative only since numerous modifications and variations therein will be apparent to those skilled in the art.

Throughout this application, various publications are referenced. The disclosures of these publications in their entireties are hereby incorporated by reference into this application in order to more fully describe the state of the art to which this invention pertains.

EXAMPLES

Example 1

Model Spoilage Organisms in Milk Subjected to HPT

Numerous spoilage organisms have been reported in a variety of food media, including: *Bacillus subtilis* (Sojka and Ludwig, 1995, Heinz and Knorr, 1996),; *Bacillus coagulans* (Roberts and Hoover, 1996), *Carnobacterium divergens* (Obrien and Marshall, 1996), *Citrobacter freundii* (Carlez et al., 1993), *Clostridium sporogenes* (Crawford et al., 1996), *Escherichia coli* (Capellas et al., 1996, Patterson et al., 1995, Welch et al., 1993), *Listeria innocua* (Carlez et al., 1993, Gervilla et al., 1997, Raffalli et al., 1994), *Listeria monocytogenes* (Mackey et al., 1994, Mackey et al., 1995, Patterson et al., 1995), *Pseudomonas fluorescens* (Carlez et al., 1993), *Saccharomyces cerevisiae* (Aleman et al., 1996, Hashizume et al., 1995, Pandya et al., 1995), *Salmonella enteridis* (Patterson et al., 1995), *S. thompson* (Mackey et al., 1994), *Salmonella typhimurium* (Patterson et al., 1995), *Serratia liquefaciens* (Obrien and Marshall, 1996), *Staphylococcus aureus* (Elmoueffak et al., 1995, Patterson et al., 1995), *Yarrowia lipolytica* (Lanciotti et al., 1997); *Yersinia enterocolitica* (Patterson et al., 1995), and *Zygosaccharomyces bailii* (Pandya et al., 1995).

A. Gram Negative Organisms

Bacteria of the genera Pseudomonas are non-sporing, Gram-negative rods commonly found in raw milk. While pseudomonads do not survive conventional high temperature short time pasteurization, these organisms are psychrotrophic and are often involved in the spoilage of refrigerated, pasteurized milk (Jay, 1992). The species *Pseudomonas putida* was selected as a Gram-negative model milk-spoilage organism to test microbicidal effects of the HPT process. The thermal resistance of *P. putida* was studied by Mulak et al. (1995) and a $D_{70}$ and z-value of 0.002 min and 5° C., respectively, were calculated for the organism in phosphate buffer. Stationary-phase cultures of *P. putida* were prepared by inoculating 3500 ml of sterile tryptic soy broth (TSB) with 3.5 mL of a 12 hour TSB culture of *P. putida* (American Type Culture, batch 92-04SV) and incubating at 32° C. until the broth reached a stable, self-limiting population of approximately $10^8$ cfu/ml (within 24 h). To remove metabolites from the *P. putida* culture, the cells were washed and re-suspended. The old broth was removed by centrifuging (Sorvall RC5B) approximately 3,000 ml of the culture in sterile 250 ml polypropylene bottles at 13,180×g for 20 min and decanting. The pellets were resuspended in sterile TSB and centrifuged again, followed by decanting the TSB wash and a final re-suspension in 2,000 ml TSB and storage at 4° C. HPT treatment was performed within 24 h as described below. Microbial counts were made according to the procedure stated below for the native milk microflora, except that treatments were spread-plated on TSA in at least three subsamples. The experiment was replicated four times with HPT treatments conducted in random order.

B. Gram Positive Organisms

Bacteria of the genera Lactobacillus are non-sporing, Gram-positive, micro-aerophilic rods commonly found in raw milk, and thermoduric strains are known to survive the thermal pasteurization process. Lactobacilli are involved in the later stages of spoilage of pasteurized milk and grow below the pH which limits other spoilage organisms (Jay, 1992). The species *Lactobacillus sake* was selected as a model Gram-positive organism to test microbicidal effects of the HPT process on this group of bacteria, using both unwashed and washed stationary phase cultures. The thermal resistance of *L. sake* was studied by Franz and Vonholy (1996) and D-values of 52.9, 39.3 and 32.5 sec were calculated for the organism in vitro at 57, 60 and 63 C, respectively. Stationary-phase cultures of *L. sake* were prepared by inoculating 3500 ml of sterile deMan-Rogosa-Sharpe (MRS) broth with 3.5 mL of a 24 h MRS broth culture of *L. sake* (American Type Culture Collection No. 15521) and incubating at 32° C. until the broth reached a stable, self-limiting population of approximately $10^8$ cfu/ml (within 48 h). Cultures were stored at 4° C. for 12 to 24 h before treatment. Washed cultures were prepared by decanting the spent broth after centrifugation. The pellets were re-suspended in sterile MRS broth and centrifuged again, followed by decanting the MRS broth wash and a final resuspension in approximately 2000 ml MRS broth and storage at 4° C. HPT treatment of the washed cultures was made within 24 h of the washing process. The pH of washed and unwashed cultures were 5.8 and 4.5, respectively. The pH of uninoculated MRS broth was approximately 5.7. A stationary-phase *L. sake* culture was washed, then acidified with 0.25M citric acid solution to a pH equal to that of the unwashed culture. Washed, unwashed and washed/re-acidified cultures were subjected to HPT and enumerated by spread-plating on MRS agar in at least two subsamples. The plates were incubated at 32° C. for 48 h to allow for recovery of sublethally-injured cells before counting. Microbicidal effect was evaluated as the number of decimal reductions, $\log_{10}(N_o/N)$, where $N_o$ is the count in the untreated sample and N is the count in the HPT-treatment sample, in units of colony forming units (cfu)/ml.

C. Materials and Methods (i) Milk Concentration by Ultrafiltration

The milk used in the study was raw, unpasteurized skim milk obtained from a local commercial dairy. Transportation time from the processing plant to the laboratory was under 20 min. The milk was concentrated by ultrafiltration through a spiral-wound polysulfone separator (Osmonics SEPA-50K), which had a molecular cutoff of 50,000 Daltons. The milk was recycled through the ultrafiltration unit from an initial concentration of 0.09 kg soluble solids (ss)/l until the retentate reached a target concentration of 0.15, 0.19 or 0.24±0.0010 kg ss/l, determined by refractometer (Bausch & Lomb). The permeate through the membrane had a soluble solids concentration of 0.048 kg ss/l and was also collected.

(ii) High-pressure Throttling

Permeate and milks of 0.09, 0.15, 0.19 and 0.24 kg ss/l were pressurized to 310 MPa using a pressure intensifier (HYDROPAC® P60-03CXS) and conveyed through 0.635 cm O.D.×0.15875 cm I.D. stainless steel high-pressure tubing to a micro-metering valve (AUTOCLAVE ENGINEERS® 60VRMM4882) where they were throttled to atmospheric pressure. A schematic diagram of the HPT system is given in FIG. 1. Pressure was increased behind the micrometering valve by throttling from a fully-open orifice diameter of 1.5748 mm to a nearly-closed position.

To study the effects of variations in time at high pressure, the length of tubing between the pressure intensifier and the micro-metering valve was either 7.6 or 176.5 cm, which produced maximum expected times at high pressure of 0.3 sec ("0.3P") or 1 sec ("1P"), respectively. Throttling at the micro-metering valve elevated the temperature of milks from an entrance temperature of 4° C. to approximately 85° C. The milks were chilled immediately to a temperature below 40° C. ("0T") by passing through a heat exchanger which consisted of 250 cm of 0.476 cm O.D.×0.397 cm I.D. stainless steel tubing emersed in an ice bath. To study the effects of an extended hold time at high temperature, a 460 cm long, 0.476 cm O.D.×0.397 cm I.D., holding tube was inserted between the throttling valve and the cooling heat exchanger to hold the milks at an elevated temperature of greater than 80° C. for 10 sec ("10T"). All milks were collected at temperatures less than 25° C. and immediately stored at 4° C. Based on high-pressure dwells of either 0.3 sec or 1 see (0.3P or 1P) and high-temperature dwells of either 0 sec or 10 sec (0T or 10T), there were four variations of HPT treatment: 0.3P/0T, 0.3P/10T, 1P/0T and 1P/10T.

(iii) Inactivation of Native Milk Microflora

The microbicidal effect of the HPT process was first evaluated on the native milk microflora. Total aerobic counts were made by pour-plating in tryptic soy agar (TSA) in at least two subsamples. The plates were incubated at 3° C. for 72 h to allow for recover of sublethally-injured cells before counting. Microbicidal effect was evaluated as the number of decimal reductions, $\log(N_o/N)$, where $N_o$ is the total aerobic count in the untreated milk and N is the count in the HPT-treatment milk, in units of cfu/ml.

(iv) Milk Gelation

Gelation of HPT-treated milks was studied using a method adapted from Ker and Toledo (1992). HPT-treated milks and controls were divided into samples of 30 mL in 50 mL beakers and equilibrated to 25° C. using a water bath. At time zero, the samples were transferred inside a steam autoclave vented to atmospheric pressure. At 15, 26, 48, 60, 75 and 87 min, two samples of each treatment were removed and cooled rapidly in ice and stored at 4° C. for 24 h before evaluation. In addition to unpasteurized controls, unpasteurized skim milk homogenized (GAULIN 15MR-8T) at 20.68 MPa and retail pasteurized skim milk were also tested.

(v) Milk Viscosity

The viscosities of the HPT samples and untreated controls were determined within 24 h following HPT treatment using an automated rotary viscometer (HAAKE® RV20/RC20) with an NV cup-and-spindle assembly at 25° C.

D. Results (i) Inactivation of Native Milk Microflora

All four HPT treatments reduced the viability of the native microflora in the milks containing 0.09 and 0.15 kg ss/l by 2.5 to 4 log cycles, as shown in Table 1. The 0.3P/0T HPT process was similarly effective for milks containing 0.19 and 0.24 kg ss/l.

(ii) Inactivation of Model Milk Spoilage Organisms by HPT a. Grain Negative Organisms All four variations of the HPT treatment inactivated *P. putida* suspended in sterile tryptic soy broth from an initial population of approximately $10^8$ c.f.u./mL to undetectable levels at 0.1 dilution. Images from scanning electron microscopy (SEM) show distinct spheroid bulges on bacterial cell surfaces and a large amount of debris, suggesting that the HPT process is very disruptive to cell membranes.

b. Gram Positive Organisms

In Table 2, data is presented on the inactivation of *L. sake* in two different HPT devices. Using published D-values of 52.9, 39.3 and 32.5 sec at 57, 60 and 63° C. respectively for *L. sake* (Franz and Vonholy, 1996), a D-value of 5.4 sec can be calculated for the organism at 85° C. It is possible to use this data to demonstrate that the brief increase in temperature upon release from the pressurized chamber does not account for the anti-microbial effect of HTP. The time to cool from 85 to 40° C. was estimated to be 4.4 sec for the ice-bath cooling coil used in the HPT process. The expected reduction in viability for the organism subjected to 85° C. for the entire 4.4 sec is 0.8 log cycles, but this would be an over-estimate of the expected reduction in the HPT1 device, since the fluid temperature is being reduced to 40° C. in those 4.4 see, rather than being held at 85° C. Similarly, the time to cool from 85 to 40° C. was calculated to be 3.4 see for the water-jacketed cooling coil used in the HPT/MICROFLUIDIZER® device, so the expected reduction in viability for the organism subjected to 85° C. for the entire 3.4 sec is 0.6 log cycles. Again, this is an overestimate reduction than would be expected in the water-jacketed cooling coil because the temperature is being reduced to 40° C. in 3.4 sec and not held at 85° C. In both devices, the reduction in the viability of *L. sake* is several log cycles more than could be expected for thermal lethality at 85° C.

These results indicate that the HPT technology can significantly reduce *L. sake* contamination in milk.

(iii) Milk Gelation

None of the milks—including raw untreated 0.09 kg ss/l skim milk, 0.09 kg ss/l heat pasteurized skim milk, 0.24 kg ss/l untreated concentrate, 0.24 kg ss/l concentrate treated by homogenization at 3000 psi, and 0.19 kg ss/l HPT-treated skim milk concentrate—formed gels upon heating. However, 0.3P/0T HPT-treated concentrates containing 0.24 kg ss/l formed gels when stored at 4° C. for 24 h, without any additional heat treatment following the HPT process. These gels liquefied when warmed to approximately 8° C., and the gels were reversible for at least 7 days after pressure-treating. These results indicate that the HPT process modified dairy proteins in novel ways, and such modifications would be important in such products as yogurt and dairy desserts.

(iv) Milk Viscosity

All four variations of the HPT treatment increased the viscosity of 0.09 and 0.15 kg ss/l milks, as shown in Table 3. Increased viscosity is correlated with improved "mouth feel" of the product. This is often accomplished by the addition of ingredients such as polysaccharides. The HPT process provides an alternative approach to improving food texture without adding ingredients.

Example 2

Yeast in High Acidity Foods Subjected to HPT

A. Methods

*Zygosaccharomyces bailii* was selected as a model spoilage organism for evaluating the microbicidal effect of the HPT process when applied to fruit products and other high-acid foods. *Z. bailii* is an ascosporogenous yeast that has been noted for its ability to spoil otherwise shelf-stable foods such as mayonnaise, salad dressings, fruit concentrates, soft drinks and wines and its resistance to preservatives such as acetic, sorbic and benzoic acids and $SO_2$ (Makdesi, 1995). The thermal resistance of *Z. bailii* var. *bailii* and *Z. bailii* var. *osmophilus* was studied by Put and De Jong (1982) and $D_{60C}$ values for ascospores were calculated to be 14.2 and 11.0 min., respectively. For vegetative cells, values of $D_{60C}$ were determined to be 0.10 min for var. *bailii* and 0.14 min for var. *osmophilus*, and z-values were between 4.0 to 4.5 C and 4.8 to 5.0 C, respectively.

*Zygosaccharomyces bailii* (FRR 2227) was obtained from the Center for Food Safety and Quality Enhancement, Griffin, Ga. Stationary-phase cultures of *Z. bailii* were prepared by inoculating 3500 ml of sterile yeast malt broth (YMB) with 3.5 ml of a 24 h *Z. bailii* culture in YMB and incubating at 32° C. for approximately 29 h. Cultures were stored at 4° C. for 12 to 24 h before treatment. Washed cultures were prepared using the same method as described for *L. sake* (in section 1.B. of this application) with YMB substituted for MRS broth and stored at 4° C. HPT treatment of the washed cultures was made within 24 h of the washing process.

B. Results

The HPT/MICROFLUIDIZER® device (described in Example 4.B.) reduced viability of unwashed *Z. bailii* cultures by approximately 2.6 log cycles. In general, fungi have strong chitinous cell walls (Brock and Madigan, 1991), and this structural difference between fungi and bacteria would be expected to influence the exact conditions required for inactivation. As shown below, the HPT/MICROFLUIDIZER® device can accomplish significant reductions in the concentration of *Z. bailii* in fluids:

| Log-cycle reduction (LCR)[a] in viability of *Z. bailii*. | |
|---|---|
| unwashed | |
| mean | 2.62 |
| $s_x$ | 0.05 |
| replicates | 3 |

[a]Log-cycle reduction LCR = $log(N_0/N)$ where N = the total microbial count (cfu/ml) of the milk treated by HPT and $N_0$ = the initial or control total microbial count (cfu/ml).

Example 3

Preparation and Evaluation of Yogurt Made from HPT-treated Milk

A. Methods

Yogurt stock for HPT-treated samples was prepared by blending appropriate amounts of HPT-treated milk containing 0.15 kg ss/l and HPT-treated permeate to obtain a concentration of 0.12 kg ss/l. Yogurt stock for controls was prepared from retail skim milk with non-fat dry milk added to increase solids content to 0.12 kg ss/l. Yogurts were inoculated with 20 g of active-culture nonfat yogurt per 1l yogurt stock and stirred rapidly for 10 min. The mixture was then divided into 120 ml sterile containers and 1.5 ml (1.5528 g) centrifuge tubes and incubated at 32° C. until a pH of approximately 5.2 was reached (ca. 24 h). The yogurt was stored at 4° C. for 5 to 7 days before testing. Yogurt viscosities were measured at 0.0167, 0.0417 and 0.0833 rpsec using a rotational viscometer (Brookfield RVTD with Helipath Stand) fitted with a T-spindle driven downward into the 120 ml sample in a uniform helical path.

To account for possible differences in water loss during fermentation, water holding capacity (WHC) was reported as a relative value based on water content before fermentation of 1.3665 g water/1.5 ml sample.

B. Results

Yogurt prepared from 0.3P/5T HPT-treated milks held significantly more water than controls, as shown in Table 4, and yogurt prepared from 0.3P/0T HPT-treated milks exhibited greater mean apparent viscosities than controls. This again indicates that the HPT process can improve the textural characteristics of yogurt.

Example 4

Performance of Two Different Device Configurations

A. HPT1 Device

One device, HPT1, was configured so that the HPT process was accomplished by a 0.3 sec high-pressure dwell at 310 Mpa, followed by throttling the fluid through a micrometering valve. This device uses a double-acting electro-hydraulic pressure intensifier (HYDROPAC P60-03CXS) to throttle the fluid through a micro-metering valve (AUTOCLAVE ENGINEERS 60VRMM4882) to atmospheric pressure. Throttling at the micro-metering valve elevated the temperature of process fluid from an entrance temperature of 4° C. to approximately 85° C., but in-line cooling via circulation through 0.476 cm O.D.×0.397 cm I.D. stainless steel tubing emersed in an ice bath chilled cultures to a temperature below 40° C. in less than 4.5 s.

B. Modification of a MICROFLUIDIZER® M140-K for use in HPT

The MICROFLUIDIZER® from Microfluidic International Corporation is a proprietary processor device used to create "microdroplets and dispersions in liquid streams for very fine mixing and blending operations". MICROFLUIDIZER® equipment is used to formulate emulsions (as in processed foods and medicines), dispersions (as in inks, pigments and coatings), liposomes (in encapsulation of medications or nutrients) and in biotechnology, to harvest, through cell disruption, the internal contents of plant and animal cells (description taken from Microfluidics International Corporation Form 10-K filed in March, 1997, with the Securities and Exchange Commission).

The Microfluidics devices are sold commercially and include some components useful in practicing the present invention, including aseptic fluid handling (both on the delivery and collection sides) and liquid pressurizing capability. One model, M140-K, is configured with explosion proof motor, sarter and electrical controls. The inventors modified an M140-K by bypassing the proprietary "interaction chamber" (in which incoming fluids are split into two or more pressurized streams and directed to collide and interact, e.g. to form emulsions) and directing a pressurized fluid stream through a micrometering valve. Thus, in this HPT/MICROFLUIDIZER® configuration, pressurization of the liquid is accomplished by a double-acting electro-hydraulic pressure intensifier (Microfluidics IP40-05SP). Throttling through this modified MICROFLUIDIZER® elevated the temperature of the processed fluid from an entrance temperature of 4° C. to approximately 85° C., but in-line cooling via circulation through 0.635 cm O.D.×0.159 cm I.D. stainless steel in a water jacket at 12° C. chilled cultures to a temperature below 40° C. in less than 3.4 s. A summary of the parameters of the two device configurations described above is given in Table 5.

C. Results

Treatment of unwashed *L. sake* cultures in the HPT/MICROFLUIDIZER® reduced viable cells by more than 8 log cycles, and treatment in the HPT1 device reduced viable cells by about 4 log cycles. The differences in microbicidal effect appear to be due to the difference in the action of specific pressure intensifiers used in each configuration. The Hydropac pressure intensifier in the HPT1 device has a lower minimum pressure between strokes when the dual-acting piston is changing directions: approximately 151 MPa compared to 220 MPa for the HPT/MICROFLUIDIZER® device. The HPT1 device ramps from approximately 151 MPa to 310 MPa over the course of the entire piston stroke, while the HPT/

MICROFLUIDIZER® device ramps from approximately 220 MPa to 276 MPa more quickly, most likely due to the pressure controller and perhaps more reliable, faster-seating check valves.

Both devices are expected to, and were observed to, allow flow of small amounts of process fluid through the throttling constriction between strokes when the device is not at the "target" maximum pressure (the maximum pressure achieved during the piston stroke before the piston changes direction). Depending on the specific application for which the device will be used, the exact configuration and resulting minimum pressure values achieved can be customized.

It should be clear from the above Examples that the HPT process is a versatile, nonthermal approach for inactivating microbes in fluids. The device configurations are flexible and can be optimized to effectively eliminate a wide range of microorganisms.

Although the present process has been described with reference to specific details of certain embodiments thereof, it is not intended that such details should be regarded as limitations upon the scope of the invention except as and to the extent that they are included in the accompanying claims.

REFERENCES

Aleman, G., Farkas, D. F., Torres, J. A., Wilhelmsen, E., and McIntyre, S. 1994. Ultra-High Pressure Pasteurization Of Fresh Cut Pineapple. *J Food Prot* 57: 931–934.

Aleman, G. D., Ting, E. Y., Mordre, S. C., Hawes, A. C. O., Walker, M., Farkas, D. F., and Torres, J. A. 1996. Pulsed Ultra-High Pressure Treatments For Pasteurization Of Pineapple Juice. *J Food Sci* 61: 388–390.

Bailey, S. M., Blum, P. H., and Meagher, M. M. 1995. Improved Homogenization Of Recombinant *Escherichia-coli* Following Pretreatment With Guanidine-Hydrochloride. *Biotechnol Prog* 11: 533–539.

Baldwin, C., and Robinson, C. W. 1992. Increased Disruption Resistance Of Candida-Utilis Grown From Survivors Of Enzymatic Lysis Combined With High-Pressure Homogenization. *Lett Appl Microbiol* 15: 59–62.

Brock, T. D. and Madigan, M. T. *Biology of Microorganisms*, 6th edition. Englewood Cliffs: Prentice Hall, p 64 (1991)

Capellas, M., Mormur, M., Sendra, E., Pla, R., and Guamis, B. 1996. Populations Of Aerobic Mesophils and Inoculated *Escherichia coli* During Storage Of Fresh Goats Milk Cheese Treated With High-Pressure. *J Food Prot* 59: 582–587.

Carlez, A., Rosec, J. P., Richard, N., and Cheftel, J. C. 1993. High-Pressure Inactivation of *Citrobacter freundii, Pseudomonas fluorescens* and *Listeria innocua* in Inoculated Minced Beef Muscle. *Lebensm Wiss Technol* 26: 357–363.

Cheftel, J. C. 1995. Review—High-Pressure, Microbial Inactivation and Food Preservation. *Food Sci Technol Int* 1: 75–90.

Crawford, Y. J., Murano, E. A. O. D. G., and Shenoy, K. 1996. Use Of High Hydrostatic-Pressure and Irradiation to Eliminate *Clostridium sporogenes* Spores In Chicken Breast. *J Food Prot* 59: 711–715.

Elmoueffak, A., Cruz, C., Antoine, M. M. M., Demazeau, G., Larg eteau, A., Roy, B., and Zuber, F. 1995. High-Pressure and Pasteurization Effect On Duck Foie Gras. *Int J Food Sci Technol* 30: 737–743.

Fantin, G., Fogagnolo, M., Guerzoni, M. E., Lanciotti, R., Medici, A. P. P., and Rossi, D. 1996. Effect Of High Hydrostatic-Pressure and High-Pressure Homogenization On the Enantioselectivity Of Microbial Reductions. *Tetrahedron-Asymmetry* 7: 2879–2887.

Franz, C. M. A. P. and Vonloy A. 1996. Thermotolerance of Meat Spoilage Lactic-Acid Bacteria and Their Inactivation in Vacuum-Packaged Vienna Sausages. *Int J Food Microbiol* 29: 59–73.

Gallmann, P. U. and Eberhard, P. 1993. Alternative Methods for Heating Milk and Milk Products. *Int Dairy Fed Bull* 284.

Gould, G. W. 1995. Biodeterioration Of Foods and an Overview Of Preservation In the Food and Dairy Industries. *Int Biodeterior Biodegrad* 36: 267–277.

Hashizume, C., Kimura, K., and Hayashi, R. 1995. Kinetic-Analysis Of Yeast Inactivation By High-Pressure Treatment At Low-Temperatures. *Biosci Biotechnol Biochem* 59: 1455–1458.

Hauben, K. J. A., Bartlett, D. H., Soontjens, C. C. F., Cornelis, K., Wuytack, E. Y. and Michiels, C. W. 1997. *Escherichia coli* Mutants Resistant to Inactivation by High Hydrostatic Pressure. *Appl Environ Microbiol* 63: 945–950.

Heinz, V., and Knorr, D. 1996. High-Pressure Inactivation Kinetics Of *Bacillus subtilis* Cells By a 3-State-Model Considering Distributed Resistance Mechanisms. *Food Biotechnol* 10: 149–161.

Jay, J. M. 1992. *Modern Food Microbiology*, 4th edition. New York: Chapman & Hall, pp. 23–25, 234–250, 316–329, 479–509.

Knorr, D., Geulen, M., Grahl, T., and Sitzmann, W. 1994. Food Application Of High-Electric-Field Pulses. *Trends Food Sci Technol* 5: 71–75.

Lanciotti, R., Gardini, F., Sinigaglia, M., and Guerzoni, M. E. 1996. Effects Of Growth-Conditions On the Resistance Of Some Pathogenic and Spoilage Species to High-Pressure Homogenization. *Lett Appl Microbiol* 22: 165–168.

Lanciotti, R., Gardini, F., Sinigaglia, M., and Guerzoni, M. E. 1997. Physiological-Responses to Sublethal Hydrostatic-Pressure In *Yarrowia lipolytica*. *Lett Appl Microbiol* 24: 27–32.

Lehmann, G. 1996. High-Pressure Treatment—a New Food-Technology. *Fleischwirtschaft* 76: 1004–1005 LANGUAGE: German.

Mackey, B. M., Forestiere, K., and Isaacs, N. 1995. Factors Affecting the Resistance Of Listeria-Monocytogenes to High Hydrostatic-Pressure. *Food Biotechnol* 9: 1–11.

Mackey, B. M., Forestiere, K., Isaacs, N. S., Stenning, R., and Brooker, B. 1994. The Effect Of High Hydrostatic-Pressure On *Salmonella thompson* and *Listeria monocytogenes* Examined By Electron-Microscopy. *Lett Appl Microbiol* 19: 429–432.

Makdesi, A. K. 1995. Development of a Selective Medium for Enumerating Preservative-Resistant *Zygosaccharomyces bailii*. M. S. thesis. The University of Georgia, Athens, Ga.

Mertens, B., and Deplace, G. 1993. Engineering Aspects Of High-Pressure Technology In the Food-Industry. *Food Technol* 47: 164–169.

Mertens, B., and Knorr, D. 1992. Developments Of Nonthermal Processes For Food Preservation. *Food Technol* 46: 124.

Middelberg, A. P. J. 1995. Process-Scale Disruption Of Microorganisms. *Biotechnol Adv* 13: 491–551.

Mulak, V., Tailliez, R., Eb, P. and Becel, P. Heat-Resistance of Bacteria Isolated from Preparations Based on Seafood Products. *J Food Prot* 58: 49–53.

Nakagami, T., Shigehisa, T., Ohmori, T., Taji, S., Hase, A., Kimura, T., and Yamanishi, K. 1992. Inactivation Of Herpes Viruses By High Hydrostatic-Pressure. *J Virol Methods* 38: 255–261.

Nakagami, T., Ohno, H., Shigehisa, T., Otake, T., Mori, H., Kawahata, T., Morimoto, M. and Ueba., N. 1996. Inactivation of Human Immunodeficiency-virus by High-hydrostatic Pressure. *Transfusion* 36: 475–476.

Obrien, J. K., and Marshall, R. T. 1996. Microbiological Quality Of Raw Ground Chicken Processed At High Isostatic Pressure. *J Food Prot* 59: 146–150.

Pandya, Y., Jewett, F. F., and Hoover, D. G. 1995. Concurrent Effects Of High Hydrostatic-Pressure, Acidity and Heat On the Destruction and Injury Of Yeasts. *J Food Prot* 58: 301–304.

Patterson, M. F., Quinn, M., Simpson, R., and Gilmour, A. 1995. Sensitivity Of Vegetative Pathogens to High Hydrostatic-Pressure Treatment In Phosphate-Buffered Saline and Foods. *J Food Prot* 58: 524–529.

Popper, L. and Dietrich, K. Application of high-pressure homogenization for food preservation. *Food Technology*, 44, 84–89 (1990)

Popper, L. and D. Knorr. 1990. Application of High-Pressure Homogenization for Food Preservation. *Food Technol* 44:84–89.

Pothakamury, U. R., Barbosacanovas, G. V. S. B. G., and Meyer, R. S. 1995. The Pressure Builds For Better Food-Processing. *Chem Eng Prog* 91: 45–53.

Put, H. M. C. and De Jong, J. 1982. The Heat Resistance of Ascospores of Four Saccharomyces Spp. Isolated from Spoiled Heat-processed Soft Drinks and Fruit Products. *J Appl Bacteriol* 52: 235–243.

Raffalli, J., Rosec, J. P., Carlez, A., Dumay, E., Richard, N., and Cheftel, J. C. 1994. High-Pressure Stress and Inactivation Of *Listeria innocua* In Inoculated Dairy Cream. *Sci Aliments* 14: 349–358 LANGUAGE: French.

Roberts, C. M., and Hoover, D. G. 1996. Sensitivity Of *Bacillus coagulans* Spores to Combinations Of High Hydrostatic-Pressure, Heat, Acidity and Nisin. *J Appl Bacteriol* 81: 363–368.

Siddiqi, S. F., Bulmer, M., Shamlou, P. A., and Titchenerhooker, N. J. 1995. The Effects Of Fermentation Conditions On Yeast-Cell Debris Particle-Size Distribution During High-Pressure Homogenization. *Bioprocess Eng* 14: 1–8.

Siddiqi, S. F., and Titchenerhooker, N. J. S. P. A. 1996. Simulation Of Particle-Size Distribution Changes Occurring During High-Pressure Disruption Of Bakers-Yeast. *Biotechnol Bioeng* 50: 145–150.

Sojka, B., and Ludwig, H. 1995. Pressure Sensitivity Of *Bacillus subtilis* Spores That Survived Previous High-Pressure Treatments. *Pharm Ind* 57: 251–252.

Welch, T. J., Farewell, A., Neidhardt, F. C., and Bartlett, D. H. 1993. Stress-Response Of *Escherichia-coli* to Elevated Hydrostatic-Pressure. *J Bacteriol* 175: 7170–7177.

Yamamoto, K., Hayashi, S., and Yasui, T. 1993. Hydrostatic Pressure-Induced Aggregation Of Myosin Molecules In 0.5 M Kcl At Ph 6.0. *Biosci Biotechnol Biochem* 57: 383–389.

TABLES

TABLE 1

Log-cycle reduction (LCR)[a] in viability of native milk microflora due to the High-Pressure Throttling (HPT) treatment.

|  | 0.3P/0T[b] | 0.3P/10T[c] | 1P/0T[d] | 1P/10T[e] |
|---|---|---|---|---|
| 0.09 kg s.s./L[f] | | | | |
| mean | 3.11 | 3.83 | 3.1 | 3.6 |
| $s_x$ | 0.86 | 0.81 | 1.04 | 0.51 |
| replicates | 9 | 4 | 3 | 3 |
| 0.15 kg s.s./L[g] | | | | |
| mean | 3.68 | 3.93 | 2.68 | 2.67 |
| $s_x$ | 0.39 | 0.74 | 1.06 | 0.92 |
| replicates | 5 | 4 | 3 | 3 |

TABLE 1-continued

Log-cycle reduction (LCR)[a] in viability of native milk microflora due to the High-Pressure Throttling (HPT) treatment.

|  | 0.3P/0T[b] | 0.3P/10T[c] | 1P/0T[d] | 1P/10T[e] |
|---|---|---|---|---|
| 0.19 kg s.s/L[g] | | | | |
| mean | 2.51 | ND | ND | ND |
| $s_x$ | 0.30 | | | |
| replicates | 3 | | | |
| 0.24 kg s.s./L[g] | | | | |
| mean | 3.6 | ND | ND | ND |
| $s_x$ | 0.66 | | | |
| replicates | 3 | | | |

[a]Log-cycle reduction LCR = log($N_0$/N) where N = the total microbial count (cfu/ml) of the HPT-treated milk and $N_0$ = the initial or control total microbial count (cfu/ml).
[b]0.3P/0T denotes HPT with 0.3 sec high-pressure dwell and immediate cooling to <40° C.
[c]0.3P/10T denotes HPT with 0.3 sec high-pressure dwell and 10 sec hold at >80° C. before cooling to <40° C.
[d]1P/0T denotes HPT with 1 sec high-pressure dwell and immediate cooling to <40° C.
[e]1P/10T denotes HPT with 1 sec high-pressure dwell and 10 sec hold at >80° C. before cooling to <40° C.
[f]Skim milk with 0.09 kg soluble solids (s.s.)/L.
[g]Skim milk concentrated by ultrafiltration to 0.15, 0.19 or 0.24 kg s.s./L.
ND = not determined

TABLE 2

Log-cycle reduction (LCR)[a] in viability of *L. sake*.

|  | HPT1 | HPT/MICROFLUIDIZER ® |
|---|---|---|
| unwashed | | |
| mean | 3.75 | 8.32 |
| $s_x$ | 0.89 | 0.14 |
| replicates | 3 | 3 |
| washed | | |
| mean | 2.16 | ND |
| $s_x$ | 0.17 | |
| replicates | 3 | |
| re-acidified | | |
| mean | 4.06 | ND |
| $s_x$ | 0.80 | |
| replicates | 3 | |

[a]Log-cycle reduction LCR = log($N_0$/N) where N = the total microbial count (cfu/ml) of the milk treated by High-Pressure Throttling (HPT) and $N_0$ = the initial or control total microbial count (cfu/ml).
ND = not determined

TABLE 3

Viscosities of control skim milk and concentrates and changes in viscosities[a] of skim milk and concentrates due to High-Pressure Throttling (HPT) treatment.

| | | Δviscosity after HPT (mPa · s) | | | |
|---|---|---|---|---|---|
| Sample type | viscosity (mPa · sec) | 0.3P/0T[b] | 0.3P/10T[c] | 1P/0T[d] | 1P/10T[e] |
| 0.09 kg ss/l[f] | | | | | |
| mean | 1.370 | 1.468 | 1.245 | 1.461 | 1.416 |
| $s_x$ | 0.148 | 0.166 | 0.173 | 0.291 | 0.292 |
| replicates | 14 | 10 | 3 | 3 | 3 |

TABLE 3-continued

Viscosities of control skim milk and concentrates and changes in viscosities[a] of skim milk and concentrates due to High-Pressure Throttling (HPT) treatment.

Δviscosity after HPT (mPa · s)

| Sample type | viscosity (mPa · sec) | 0.3P/0T[b] | 0.3P/10T[c] | 1P/0T[d] | 1P/10T[e] |
|---|---|---|---|---|---|
| 0.15 kg ss/l[g] | | | | | |
| mean | 3.189 | 3.553 | 3.431 | 4.004 | 3.562 |
| $s_x$ | 0.592 | 0.352 | 0.473 | 1.518 | 0.270 |
| replicates | 9 | 6 | 3 | 3 | 3 |
| 0.19 kg ss/l[g] | | | | | |
| mean | 6.101 | 6.987 | ND | ND | ND |
| $s_x$ | 0.701 | 0.214 | | | |
| replicates | 3 | 3 | | | |
| 0.24 kg ss/l[g] | | | | | |
| mean | 19.257 | 33.013 | ND | ND | ND |
| $s_x$ | 0.801 | 4.062 | | | |
| replicates | 3 | 3 | | | |

[a]Change in viscosity $\Delta \mu = \mu_{HPT} - \mu_C$ where $\mu_{HPT}$ = the viscosity of the HPT-treated milk and $\mu_C$ = the viscosity of the control milk.
[b]0.3P/0T denotes HPT with 0.3 sec high-pressure dwell and immediate cooling to <40° C.
[c]0.3P/10T denotes HPT with 0.3 sec high-pressure dwell and 10 sec hold at >80° C. before cooling to <40° C.
[d]1P/0T denotes HPT with 1 sec high-pressure dwell and immediate cooling to <40° C.
[e]1P/10T denotes HPT with 1 sec high-pressure dwell and 10 sec hold at >80° C. before cooling to <40° C.
[f]Skim milk with 0.09 kg soluble solids (ss)/l.
[g]Skim milk concentrated by ultrafiltration to 0.15, 0.19 or 0.24 kg ss/l.
ND = not determined

TABLE 4

Water holding capacity[a] (kg bound $H_2O$/kg $H_2O$) of yogurt prepared from controls and skim milk subjected to High-Pressure Throttling (HPT)treatment with 0.3 sec high-pressure dwell and immediate cooling.

| | HPT-treated | control (untreated milk) |
|---|---|---|
| mean | 0.582 | 0.461 |
| $s_x$ | 0.053 | 0.077 |
| replicates | 4 | 4 |
| subsamples per rep. | 6 | 6 |

[a]Water holding capacity (WHC) is defined in terms of an initial water content of 1.3665 g water per 1.5528 g of yogurt: WHC = (1.3665 − EW)/1.3665, where EW = water expressed by centrifugation.

TABLE 5

Summary of process parameters for different devices

| | HPT1[a] | HPT/MICROFLUIDIZER ®[b] |
|---|---|---|
| max pressure | 310 Mpa | 276 MPa |
| pressure between strokes | 151 Mpa | 220 MPa |
| pressure intensifier | hydropac | microfluidics |
| constriction | m.m. valve[c] | m.m. valve |
| flow rate | 5.4 mL/sec | 9.2 mL/sec |
| cooling coil | 0° C. ice bath | 12° C. water jacket |
| time to cool from 85 to 40° C. | 4.4 sec | 3.4 sec |

[a]HPT1 = Device described in Example 4A.
[b]HPT/MICROFLUIDIZER ® = Device described in Example 4B
[c]micrometering valve

What is claimed is:

1. A process for inactivating microorganisms in flowing or pulsed liquid, consisting of:
   a) pressurizing liquid containing viable microorganisms that is continuously-flowing or pulsed-flowing through a vessel; and
   b) depressurizing said liquid by directing it through one or a multiplicity of constrictions into an area of reduced pressure,
   wherein the depressurizing of said liquid results in at least 2.5 log cycle reduction in the number of viable microorganisms upon passage through the constriction.

2. The process of claim 1, wherein the vessel is a smooth-bored tube.

3. The process of claim 1, wherein the liquid is pressurized to a level between approximately 200–400 MPa.

4. The process of claim 1, wherein the pressurizing step is accomplished by use of a pressure intensifier and the constriction is an adjustable orifice.

5. The process of claim 4, further comprising the step of controlling the pressure between the pressure intensifier and the constriction.

6. The process of claim 4, wherein the adjustable orifice is a micrometering valve.

7. The process of claim 1, further comprising the step of immediately cooling the liquid of step b) as it exits the constriction.

8. The process of claim 6, wherein the cooling step is accomplished by passing the liquid through a heat exchanger.

9. The process of claim 7, further comprising the step of maintaining the temperature of the liquid of step b) that has been directed through the constriction by holding it in a tube, the length and diameter of said tube to determine the length of time at the designated flow rate that the liquid is to be maintained at its exit temperature.

* * * * *